United States Patent [19]

Camus

[11] Patent Number: 4,826,109

[45] Date of Patent: May 2, 1989

[54] HELICOPTER SUPPORTED MATERIAL TRANSFER ASSEMBLY

[76] Inventor: Mark D. Camus, 9301 S.W. 92nd Ave. B-104, Miami, Fla. 33176

[21] Appl. No.: 217,624

[22] Filed: Jul. 11, 1988

[51] Int. Cl.⁴ ............................................. B64D 1/22
[52] U.S. Cl. ............................... 244/137.4; 244/17.11; 414/624; 294/68.23
[58] Field of Search ................. 244/137.4, 136, 17.11, 244/31, 33, 1 TD; 414/624, 625, 626; 37/183 R; 294/68.23

[56] References Cited

U.S. PATENT DOCUMENTS

| | | | |
|---|---|---|---|
| 2,717,656 | 9/1955 | Bannister | 214/17.11 |
| 3,041,755 | 7/1962 | Ferwenda | 414/624 |
| 3,199,008 | 8/1965 | Stone | 414/624 |
| 3,369,673 | 2/1968 | Mosher | 244/33 |
| 3,606,435 | 9/1971 | Weber | 294/68.23 |
| 3,762,078 | 10/1973 | Wetherbee | 414/624 |
| 4,071,124 | 1/1978 | Price | 244/33 |
| 4,267,987 | 5/1981 | McDonnell | 244/137.4 |
| 4,364,704 | 12/1982 | Dreesen et al. | 414/624 |
| 4,553,719 | 11/1985 | Ott | 244/137.4 |

FOREIGN PATENT DOCUMENTS 236321 6/1960 Australia ........................ 244/17.11

Primary Examiner—Joseph F. Peters, Jr.
Assistant Examiner—Rodney Corl
Attorney, Agent, or Firm—John Cyril Malloy

[57] ABSTRACT

A material handling assembly primarily in the form of a clamshell structure being hyraulically activated and used in combination with a helicopter for the support of the clamshell structure and its operation thereof between a closed and an open position. The height and actual positioning of the clamshell relative to any applicable types of materials being handled or transferred is regulated by the height and positioning of the helicopter.

8 Claims, 1 Drawing Sheet

HELICOPTER SUPPORTED MATERIAL TRANSFER ASSEMBLY

BACKGROUND OF THE INVENTION

1. Field of the Invention

This invention relates to a material handling structure or assembly typically known as a clamshell-type device which is operated by and movably supported for operative positioning relative to material being handled and transferred by means of a helicopter itself being equipped to operate opening and closing of the clamshell structure through control components adapted to be mounted on the helicopter.

2. Description of the Prior Art

Clamshell-type structures are commonly known for material handling and more specifically wherein any type of applicable material, sand, gravel, rocks, etc. can be transferred from one location to another. The prior art is replete with various clamshell structures primarily which are designed to be used in a substantially conventional manner from crane powered winches, etc. Such structures are disclosed in the Dreeson, U.S. Pat. No. 4,364,704. This patent discloses a grab bucket in the form of a clamshell device suspended from a cable wherein the cable is associated and used in combination with a hoisting means having a reversible motor drive means to raise and lower the grab bucket relative to the material being handled.

Similarly Ferwerda, U.S. Pat. No. 3,041,755, discloses a clamshell-type bucket having specific structural features including a pair of tiltable bucket sections adapted to close upon each other in jaw like, grabbing motion to effect handling of the material and placing it within the grab bucket in a "scooping" type fashion. An important feature of the device disclosed therein is an improved closing motion directed to the clamshell bucket section.

Stone, U.S. Pat. No. 3,199,008, discloses a plural motor speed control for the operation of a grab bucket again in the form of a clamshell-type structure.

Also Wetherbee, U.S. Pat. No. 3,762,078. discloses a dredge structure generally in the form of what is known as a clamshell-type bucket especially adapted for taking samples from the bottom of a body of water wherein the structure comprises a hollow body open at its top and bottom but provided at both its top and bottom with closures movable between an open and a closed position and biased normally into their closed positions.

As set forth in the above noted patents and as is generally recognized in the prior art relating to this subject matter, most of the grab buckets or clamshell-type structures referred to are operated by an electrically powered winch or cable and pulley assembly normally associated with some type of crane or other similar type positioning support structure which is intended to operate in a substantially stationary location. Of course, it is acknowledged that certain of the crane type support structures are portable to the extent of being moved from one location to another. The majority of the grab buckets in the form of the clamshell-type structure are generally considered located in combination with the structure at a substantially fixed location or building site.

The above noted patents do not disclose or even suggest the use of a material handling device in the form of the aforementioned category of grab buckets being support from and operated by a portable support base or platform such as a helicopter.

However, the Bannister, U.S. Pat. No. 2,717,656, discloses a method and apparatus for use in surveying earth formation by explosion and seismograph wherein a probe type element is carried by and suspended from a helicopter and operatively disposed into the intended position again through the use of apparently a hoist type mechanism or the like. Similarly, the Huested, U.S. Pat. No. 3,730,398, discloses one or more helicopters associated with a specific lift rig or assembly for the airlifting of relatively large devices such as jeeps or the like.

None of the above noted patents specifically discloses the variety of operation and therefore increased utility of a grab bucket in the form of a clamshell-type structure specifically designed and adapted to be suspended from, positioned by and operated through specified control associated with a helicopter assembly wherein the entire material handling assembly associated with the helicopter can effectively be adapted to almost any commercially available and currently manufactured helicopter vehicle.

SUMMARY OF THE INVENTION

The present invention relates to a material handling assembly in the form of a grab bucket and which is commonly known in this industry as a clamshell structure which is adapted for the "scooping" of various types of material. Once collected, the material is then transferred from the site of collection to the site of transfer. One problem associated with this type of structure is that it is normally operated from and suspended by a crane element and raised and lowered into and out of the operative location relative to the material being transferred by a cable and winch assembly. However, the present invention is intended to add greater versatility to this basic concept through the provision of combining a uniquely structured clamshell-type grab bucket with a helicopter. Accordingly, the present invention incorporates a clamshell device being suspended from and supported by a helicopter preferably from an under portion thereof or generally at any location applicable for adequate placement and positioning of the clamshell during its material handling operations. The clamshell includes an activating means for opening and closing the various jaw sections of the structure through a hydraulic fluidic control.

A control means for the operative activation of the clamshell including its selective opening and closing occurs by virtue of a control means counted within the helicopter vehicle and disposed, designed and structured to be operated by helicopter personnel including but not limited to the pilot. To this end, a switch assembly may be mounted in the flight control area or on the "flight deck" in ready access to the pilot. Alternately, other personnel than the pilot may operate the device and attend to its accurate positioning through visual observation.

The raising and lowering of the clamshell structure occurs by the raising and lowering of the helicopter itself thereby eliminating any disadvantages associated with a conventional, normally electrically powered cable and winch assembly common to the prior art. A suspension means is in the form of an elongated suspension cable or like structure having one end releasably attached to the helicopter and the other end secured to the clamshell grab bucket itself. Therefore, while visually observing the location of the clamshell bucket, the pilot or other helicopter personnel can direct the raising or lowering or other positioning of the helicopter relative to a "pick-up site" at which the material being transferred is collected. Typically, the helicopter will be lowered into the proper position and otherwise manipulated to accomplish precise positioning of the helicopter and clamshell. Once so positioned, the clamshell grab bucket will be open, allowed to scoop-up the material for transfer and then closed. The helicopter then lifts the clamshell as it raises vertically and transfers the material contained therein to any preselected location. Greater versatility is thereby provided in the transferring of the material to locations at some distance from the pick-up site. This eliminates the need for a plurality of transport vehicles, such as trucks or the like, which is normally utilized in prior art techniques utilized in this industry.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
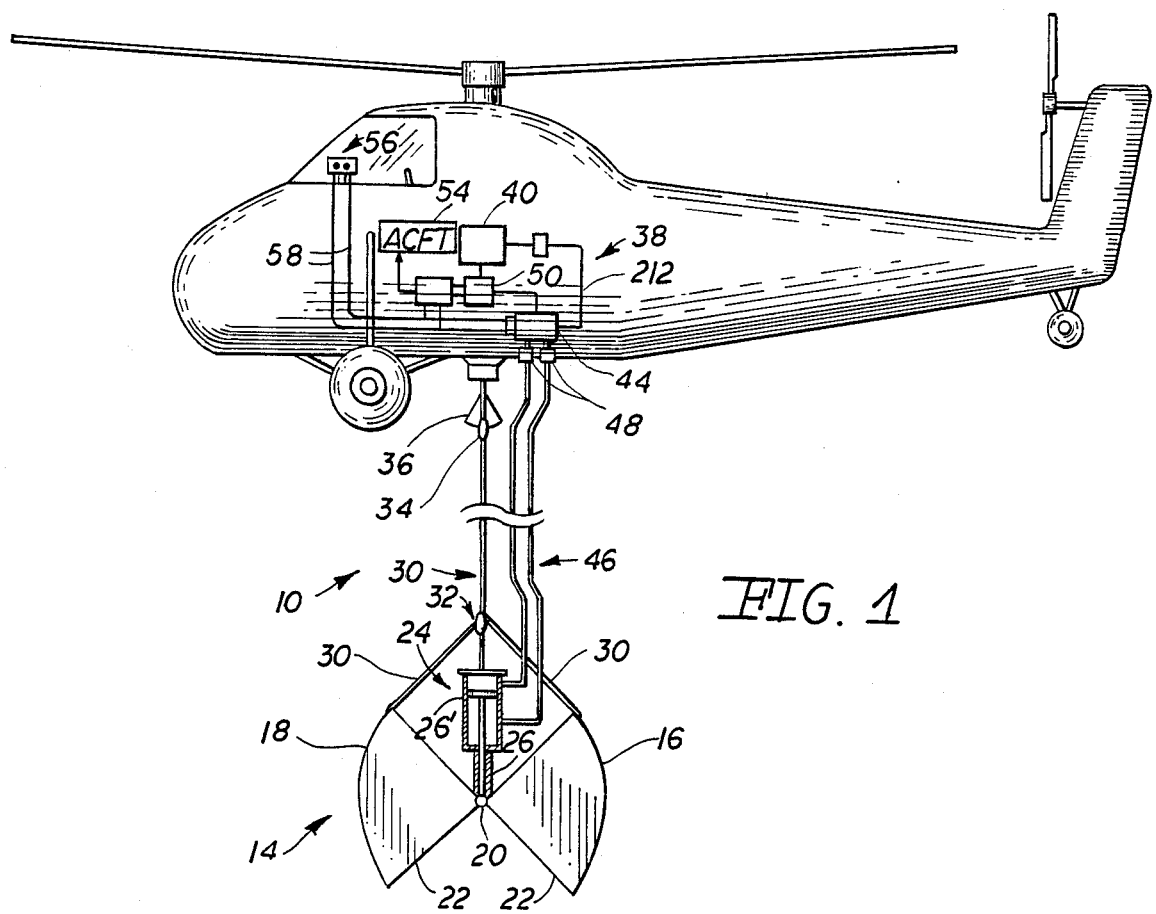
FIG. 1 is a schematic representation of the material handling assembly including a lifting or carrying helicopter having suspended therefrom a clamshell type pick-up device.
Figure 2:
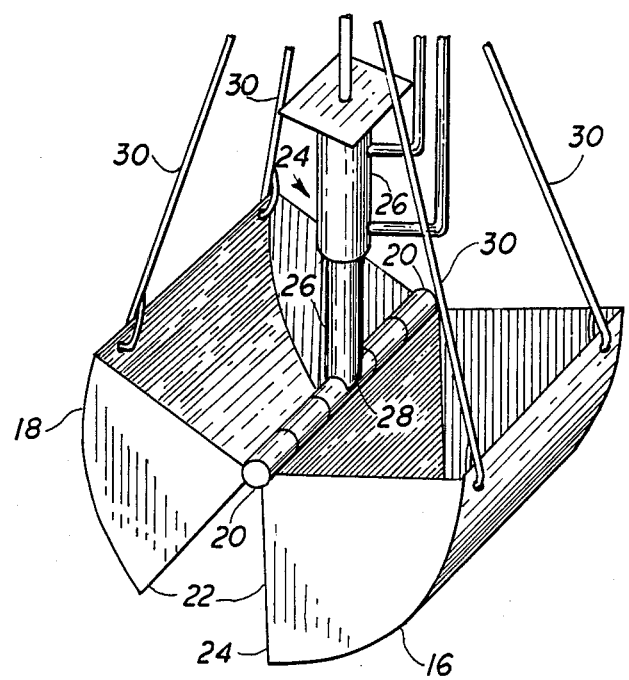
FIG. 2 is a perspective view in partial cut-away of structural details of the clamshell type pick-up device.

As shown in FIGS. 1 and 2, the material handling assembly of the present invention is generally indicated as 10 and comprises in combination a carrying and transporting helicopter type structure generally indicated as 12 used in combination with a pick-up device commonly known as a clamshell and generally indicated as 14. The clamshell or pick-up device 14 comprises a pick-up bucket shown in detail in FIG. 2 having two relatively movable shell portions and 18 pivotally interconnected by an elongated hinge 20 and having mating peripheral edges which come together in confronting relation as at 22 and 24 when bucket is in a closed and material retaining position.

An activating means is generally indicated as 24 includes preferably a hydraulic piston and cylinder arrangement. The piston and cylinder arrangement is specifically disposed and structured such that an outwardly depending piston arm 26 engages a portion of the hinge at 28. Supporting arms or like interconnecting members 30 interconnect outboard portions of the two segments 16 and 18 as clearly shown in both FIGS. 1 and 2 in such a that the outward extension of the piston member 26 will cause the clamshell segments 16 and 18 to separate thereby serving to open the pick-up structure 14 in the manner and position shown in FIGS. 1 and 2. To the contrary, the contraction or inward direction of the piston member 26 into the cylinder 26' will cause the segments 16 and 18 to move into a closed retaining position such that the edges 22 and 24 of each segment are effectively disposed in confronting relation to one another and the material on the interior of the now closed clamshell structure is retained therein.

A suspension means is generally indicated as 30 and preferably includes an elongated cable or like suspension structure having one end connected as at 32 at an appropriate location to the clamshell device 14. The opposite end as at 34 is connected by a releasable coupling assembly 36 to an under portion or other appropriate location of the supporting and carrying helicopter type vehicle 12. The connecting and or coupling assembly 36 may be any type conventionally available which allows for the ready detachment of the one end 34 of the suspension cable or like structure 30 for release and storage of the suspension cable and structure 14.

The subject invention further includes a control generally indicated as 38 and specifically mounted on interior or being considered a part of the structure of helicopter 12. Such control means includes a reservoir of hydraulic fluid 40 interconnected by appropriate conduit 42 to an activating or control valve 44. By virtue of this arrangement and further through the existence of a hydraulic conduit assembly generally indicated as 46 fluid is regulated into and out of the interior of the cylinder 26' associated with the piston and cylinder assembly defining the activation means 24 and mounted on the clamshell pick-up device 14. While not specifically shown, the suspension means 30 may be connected to and even at least partially surrounding and/or encasing the hydraulic conduit assembly 46 and of course, bares most of the suspended weight of the clamshell assembly 14.

Other features associated with the hydraulic conduit assembly includes a quick release coupling as at 48 interconnecting the hydraulic conduit assembly 46 to the helicopter 12.

The control means also includes a hydraulic pump 50 interconnected in fluid communication to the reservoir 40 so as to control the force flow of fluid into and out of the reservoir 40 for the purpose of operating the activating means 24. An electric drive motor 52 serves to drive the pump and itself may be powered from a conventional electrical power supply associated with the helicopter 12 and generally indicated as 54. The motor and/or the regulating valve 44 are controlled by a switch assembly generally indicated as 56 which may be mounted in any applicable location on the aircraft as long as such location is accessible to appropriate personnel of the helicopter. Such personnel may very well be the pilot wherein such instance the switching assembly 56 is located on the flight or control panel assembly. Obviously, such a switching assembly 56 may be at any other appropriate location and operated by a second or third party not associated with the flight or control of the vehicle per se. The switching assembly 56 may have any number of a variety of switches used to adequate control the opening and closing of the clamshell 14 through the direction of hydraulic fluid to the activating means 24 in the manner described above. Appropriate electrical connection as at 58 may be incorporated to connected the switching assembly 56 with the appropriate motor 52 and/or regulating valve 44.

Now that the invention has been described,

What is claimed is:

1. A material handling assembly used in combination with a helicopter for the support, positioning and operation thereof, said assembly comprising:

a. a clamshell device having an activating means attached thereto for the opening and closing of said clamshell,
b. a suspension assembly having an elongated configuration and connected to and supporting said clamshell at one distal end of said suspension assembly, an opposite end of said suspension assembly secured to said helicopter,
c. control means mounted on said helicopter and interconnected to said clamshell and said activating means thereof for regulating operation of said clamshell,
d. said control means and said activating means being hydraulically structured and fluid activated and connected in fluid communication to one another by a fluid conduit assembly, and
e. said fluid conduit assembly extending along the length of said suspension means and removably connected at one end thereof to said helicopter.

2. An assembly as in claim 1 wherein said control means comprises a fluid reservoir connected to said activating means via said fluid conduit assembly and a pump means interconnected in fluid communication with both said fluid reservoir and said activating means for forcing fluid flow therebetween along said fluid conduit assembly, a drive motor drivingly connected to said pump means and electrically powered by an electric generator of said helicopter.

3. An assembly as in claim 2 wherein said control means further comprises a switch assembly mounted on said helicopter at a flight control area accessible to personnel occupying the helicopter.

4. An assembly as in claim 3 further comprising a control valve means connected in fluid communication between said fluid reservoir and said activating means for regulating fluid flow therebetween, said switch assembly connected to said control valve means and cooperatively structured therewith to activate said control valve means and regulate flow of fluid therethrough.

5. An assembly as in claim 4 wherein said activating means comprises a hydraulic piston and cylinder assembly secured to said clamshell in operative engagement with a hinge assembly thereon, said hinge assembly positionable between an open and a closed position.

6. An assembly as in claim 1 further comprising a connection assembly structured to releasably connect said suspension means to said helicopter.

7. An assembly as in claim 1 further comprising a quick release coupling disposed to define an interconnection between said control means and said fluid conduit assembly.

8. An assembly as in claim 7 wherein said quick release coupling is structured to allow fluid flow therebetween and define a removable interconnection between a correspondingly positioned end of said fluid conduit assembly and said control means.

* * * * *